US009946852B1

(12) United States Patent
Cooley et al.

(10) Patent No.: US 9,946,852 B1
(45) Date of Patent: Apr. 17, 2018

(54) COMMODITY HARDWARE BASED PARENTAL CONTROL DEVICE

(75) Inventors: Shaun Cooley, El Segundo, CA (US); Rowan Trollope, Los Angeles, CA (US)

(73) Assignee: Symantec Corporation, Mountain View, CA (US)

(*) Notice: Subject to any disclaimer, the term of this patent is extended or adjusted under 35 U.S.C. 154(b) by 1056 days.

(21) Appl. No.: 12/582,702

(22) Filed: Oct. 20, 2009

(51) Int. Cl.
| | |
|---|---|
| G06F 7/04 | (2006.01) |
| G06F 12/00 | (2006.01) |
| G06F 12/14 | (2006.01) |
| G06F 13/00 | (2006.01) |
| G06F 17/30 | (2006.01) |
| G11C 7/00 | (2006.01) |
| G06F 21/12 | (2013.01) |
| G11B 20/00 | (2006.01) |
| G06F 21/34 | (2013.01) |

(52) U.S. Cl.
CPC ...... *G06F 21/123* (2013.01); *G11B 20/00159* (2013.01); *G06F 21/34* (2013.01)

(58) Field of Classification Search
CPC .. G06F 21/123; G06F 21/34; G11B 20/00159
USPC ......... 726/20, 26–30; 713/182, 185; 705/52, 705/55, 51; 717/174
See application file for complete search history.

(56) References Cited

U.S. PATENT DOCUMENTS

| | | | | |
|---|---|---|---|---|
| 6,216,230 | B1* | 4/2001 | Rallis et al. | 713/185 |
| 7,305,714 | B2* | 12/2007 | Hamaguchi | G06F 21/88 340/545.5 |
| 7,890,743 | B2* | 2/2011 | Buchanan | G06F 15/16 340/539.23 |
| 2004/0051733 | A1* | 3/2004 | Katzir | 345/741 |
| 2007/0245032 | A1* | 10/2007 | KishorVarshney et al. | 709/229 |
| 2008/0162925 | A1* | 7/2008 | Okaya | 713/155 |
| 2008/0289011 | A1* | 11/2008 | Willoughby | H04L 63/0853 726/4 |
| 2009/0083849 | A1* | 3/2009 | Wong et al. | 726/18 |

OTHER PUBLICATIONS

"GT Security Debuts SecuriKey version 3.0, Featuring Cross Platform Data Security for Windows Vista, XP & Mac OS X," Jun. 11, 2008, retrieved from the Internet: URL:http://www.securikey.com/news/securikey_3.0_release.html.
Martin McKeay, "Review: SecuriKey Professional Edition 2.1," Jul. 24, 2008, Macworld.com, retrieved from the Internet: URL:http://www.macworld.com/article/134649/2008/07/securikey21.html.

* cited by examiner

*Primary Examiner* — Daniel Potratz
(74) *Attorney, Agent, or Firm* — Patent Law Works LLP

(57) ABSTRACT

A portable hardware device such as a USB memory stick is used to provide parental locking functionality to a computer. When the device is coupled to the computer, the computer is unlocked and allowed to operate normally. When the device is not coupled to the computer, the computer is locked, and some or all of the computing functionality is blocked. This enables parents to lock and unlock a child's computer with a "key." A detecting module detects the coupling and uncoupling of devices to the computer. When a device is coupled to the computer, an identifying module identifies the device by reading its unique identifier, and determining whether the coupled device is the one being used as the key. If so, the computer is unlocked, and allowed to operate. If not, a blocking module blocks at least some capabilities of the computer.

14 Claims, 5 Drawing Sheets

COMMODITY HARDWARE BASED PARENTAL CONTROL DEVICE

TECHNICAL FIELD

This disclosure pertains generally to parental control systems, and more specifically to using commodity hardware as a basis of an effective parental control system.

BACKGROUND

Although Internet use is very widespread and of great economic and sociological value, the Internet contains a great deal of content that is not appropriate for children. As with the physical world, it is desirable that children using the Internet be supervised by involved parents. Parental control software exists that allows the filtering and blocking of content, but this software can be cumbersome and difficult for parents to use. Without configuration and use by the parents, the parental control software is ineffective. On the Internet as in the physical world, parental involvement and oversight are required to provide a responsible and healthy experience for children.

Even the most rudimentary of software/web based parental control solutions require configuration by a parent. This configuration introduces a hurdle which is "too high" for many parents. Parents say they are interested in protecting their kids online. Yet in practice, many parents do not take the actions required to effectively use the parental control systems they purchase. Perhaps even the simplest of configuration requirements such as opening a web browser, creating an account and downloading software to the child's computer is too difficult for many parents who are not familiar with computer use. Based on observed behavior, it can be posited that it is probably even "too much" to ask some parents to configure a child's computer with software which comes pre-installed with the operating system. It would be desirable to address these hurdles to usage of parental control systems.

The SecuriKey company markets a product called ControlKey®. ControlKey® uses a proprietary USB hardware encryption dongle that must be physically coupled to a computer for the computer to run. To install ControlKey®, the user needs both the hardware dongle and media (e.g., a CD-ROM) containing software drivers that must be installed on the computer. Once installed, these drivers can then recognize and communicate with the proprietary hardware dongle. The user carries the dongle, and connects it to the computer for operation. The drivers recognize the dongle, and allow the computer to run. If the dongle is not present the drivers prevent the computer from being operational. The user cannot store data on the dongle, nor are the software components of ControlKey® stored thereon. Instead, the dongle is a hardware encryption device, with which the software components of ControlKey® communicate to obtain use tokens. Although ControlKey® allows a user to "lock" his/her computer such that it can only be operated with a "key" (the dongle), ControlKey® requires an installation of software drivers which would likely be beyond many parents who are not currently using their parental control software. Additionally, the hardware dongle required by ControlKey® is expensive and proprietary.

SUMMARY

A portable hardware device such as a USB memory stick is used to provide parental locking functionality to a computer system. When the portable hardware device is coupled to the computer system, the computer system is unlocked and allowed to operate normally. When the portable hardware device is not coupled to the computer system, the computer system is locked, and some or all of the computing functionality is blocked. This enables parents to lock and unlock a child's computer system with a "key."

More specifically, a detecting module determines whether or not a portable hardware device is communicatively coupled to the computer system, by detecting the coupling and uncoupling of portable hardware devices thereto. When it is determined that a portable hardware device is communicatively coupled to the computer system, an identifying module identifies the coupled portable hardware device by reading its unique identifier. The unique identifier of a portable hardware device can be in the form of, e.g., one or more of a vendor identifier, a product identifier, a serial number and/or identifying data previously written to the portable hardware device. The identifying module uses the unique identifier of the coupled portable hardware device to determining whether the specific, coupled portable hardware device is associated with providing parental locking functionality to the computer system (i.e., whether it is the "key"). To do so, the identifying module can compare the unique identifier read from the portable hardware device to a unique identifier stored on the computer system which identifies the specific portable hardware device which is associated with providing parental locking functionality to the computer system.

Based on whether or not the specific portable hardware device associated with providing parental locking functionality to the computer system is communicatively coupled to the computer system, a locking module determines whether or not to lock the computer system. If the portable hardware device being used as the key is communicatively coupled to the computer system, the computer system is unlocked, and allowed to operate. On the other hand, if the portable hardware device being used as the key is not communicatively coupled to the computer system, a blocking module blocks at least some capabilities of the computer system. This blocking can comprise, for example, blocking all operations of the computer system, blocking all network access by the computer system, blocking Internet access by the computer system and/or blocking the playing of games or other entertainment functionality by the computer system. The detecting module also can detect when the coupled portable hardware device being used as the key becomes decoupled from the computer system, and in response block capabilities of the computer system.

An installing module can be stored on the portable hardware device for automatically installing the parental control locking system to the computer system when the portable hardware device is first coupled thereto. In other embodiments, the installing module can be stored on other media such as a CD-ROM or website, for example where the portable hardware device being used as the key does not have storage capability. In such cases, the installing module can automatically install the parental control locking system on the computer system, responsive to detecting that 1) the portable hardware device is coupled to the computer system and 2) the parental control locking system is not already installed on the computer system. The installing module can also carry out additional functions at install time, for example writing uniquely identifying data to the portable hardware device and/or writing a unique identifier of the portable hardware device to the computer system. The installing module can also prompt a user (i.e., a parent) to enter a password to associate with the parental control locking system, and store the received password on the computer system for future use.

An uninstalling module can automatically uninstall the parental control locking system from the computer system, responsive to 1) receiving an uninstall directive (e.g., from a parent or system administrator) and 2) determining that the portable hardware device being used as the key is communicatively coupled to the computer system. In case the parent loses the portable hardware device used as the key, in some embodiments, the uninstalling module can also automatically uninstall the parental control locking system from the computer system, responsive to 1) receiving an uninstall directive and 2) receiving entry of a password associated with the parental control locking system. In some embodiments the password can also be used to automatically associate a new portable hardware device with providing parental locking functionality to the computer system.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
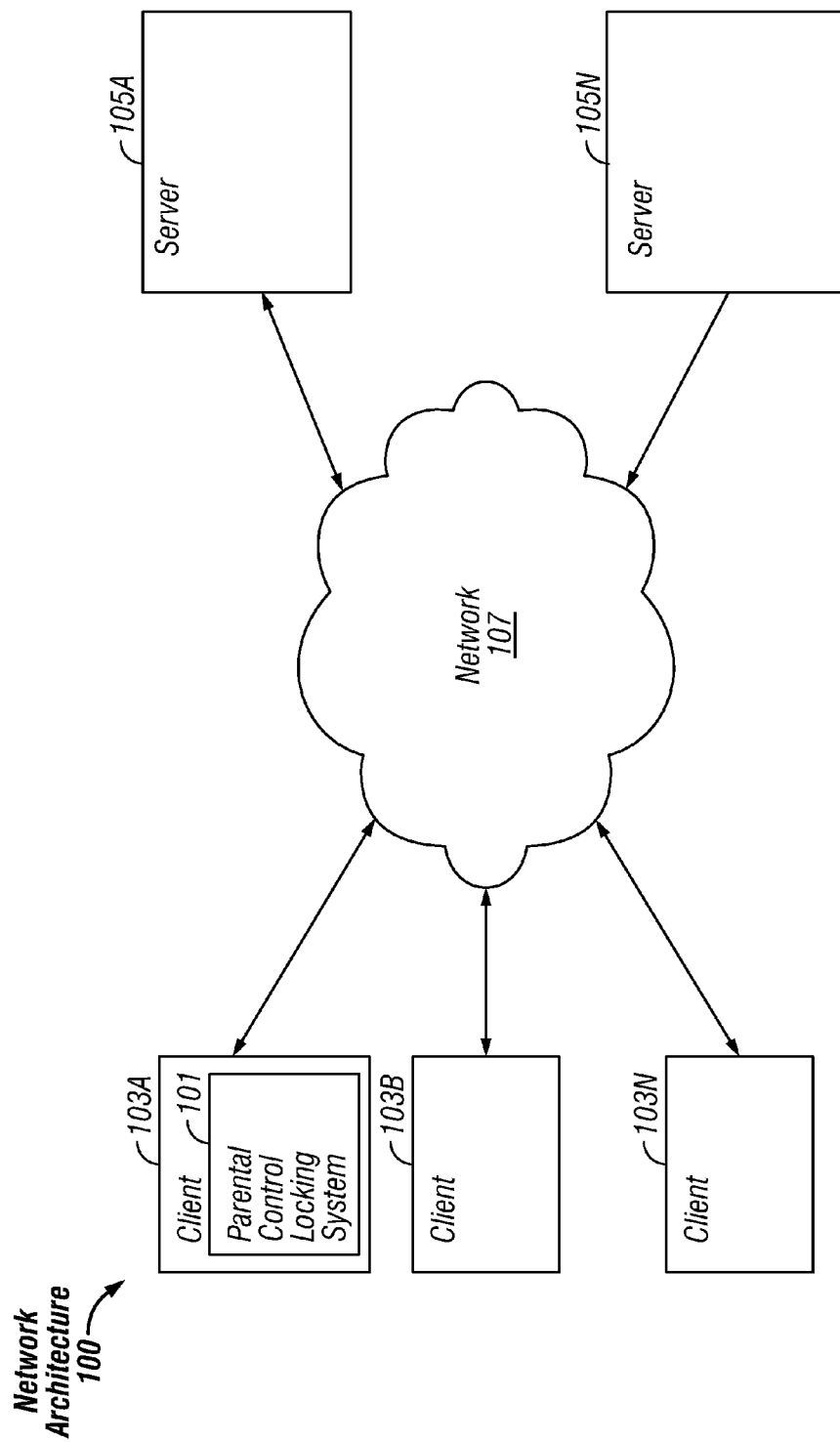
FIG. 1 is a block diagram of an exemplary network architecture in which a parental control locking system can be implemented, according to some embodiments.

FIG. 1 is a block diagram illustrating an exemplary network architecture 100 in which a parental control locking system 101 can be implemented. The illustrated network architecture 100 comprises multiple clients 103A, 103B and 103N, as well as multiple servers 105A and 105N. In FIG. 1, the parental control locking system 101 is illustrated as residing on client 103A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
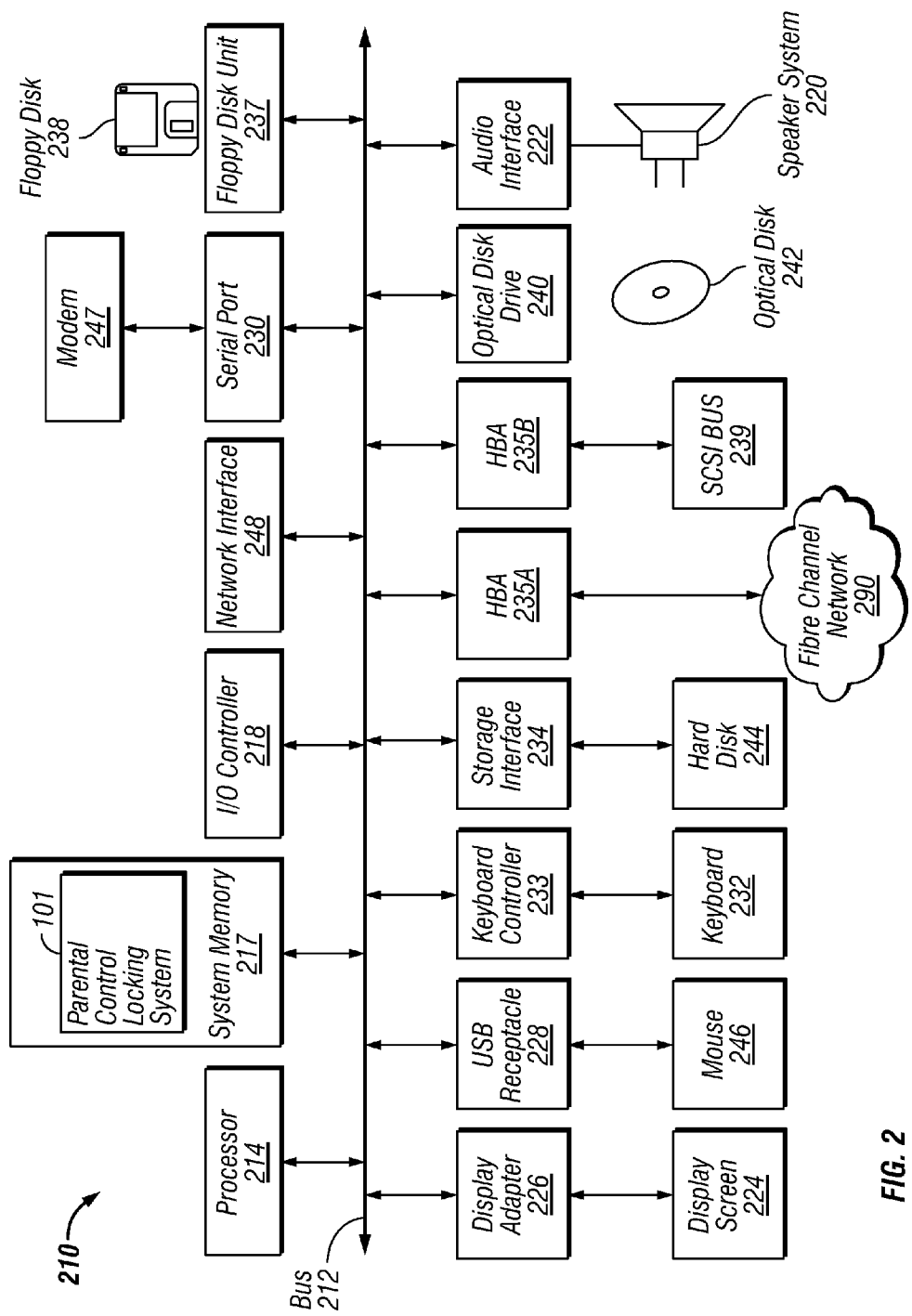
FIG. 2 is a block diagram of a computer system suitable for implementing a parental control locking system, according to some embodiments.

FIG. 2 is a block diagram of a computer system 210 suitable for implementing a parental control locking system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the parental control locking system 101 is illustrated as residing in system memory 217. The workings of the parental control locking system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
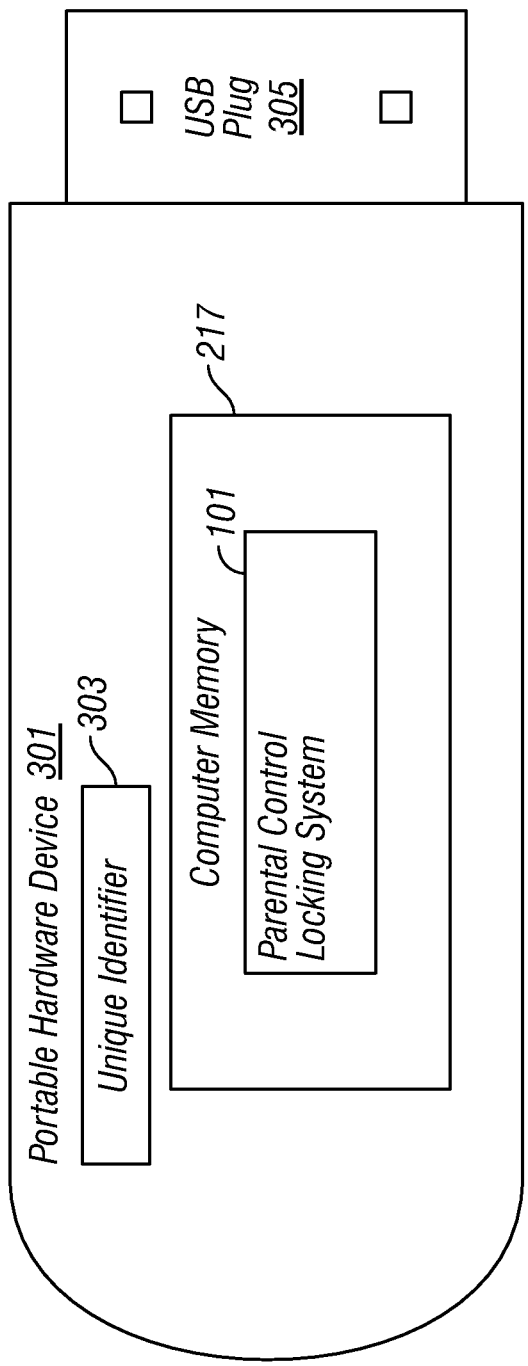
FIG. 3 is a block diagram of a portable hardware device for use with a parental control locking system, according to some embodiments.

FIG. 3 illustrates a portable hardware device 301 that is utilized by the parental control locking system 101 to lock and unlock a computer system 210 so that it can be controlled by a parent 403. The portable hardware device 301 is configured such that it can be readily coupled to a computer system 210. For example, in one embodiment the portable hardware device 301 is equipped with a USB plug 305 (as illustrated) for physically connecting to a USB receptacle 228 on a computer system 210. In other embodiments, the portable hardware device 301 is configured for connecting to other types of interfaces such as a serial port 230, parallel port, etc. The portable hardware device 301 can also be readily decoupled from the computer system 210 by disconnecting it from the computer system 210. In some embodiments this coupling can be via wireless communication as opposed or in addition to physical connection. The portable hardware device 301 has a unique identifier 303, such that it can be definitively identified by a parental control locking system 101 on a computer system 210 to which it is coupled. The portable hardware device 301 is typically small, such that it can be carried in a pocket or the like when not physically connected to a computer system 210.

In one embodiment, the portable hardware device 301 is in the form of a USB memory stick. A USB memory stick contains computer memory 217 (as illustrated), which can be used to store the parental control locking system 101 for installation on a computer system 210, as described below in conjunction with FIG. 4. USB memory sticks are also very inexpensive, and have unique identifiers 303 in the form of unique manufacturer identifiers, product numbers, and/or serial numbers. Any one, all or a combination of these identifiers can be used as a unique identifier 303 of a portable hardware device 301, as described in more detail below. In the case of a USB memory stick or other form of portable hardware device 301 that contains computer memory 217, the unique identifier 303 can also be in the form of a file containing unique data (such as a GUID or a given amount of random data). This file can be stored in the computer memory 217 of the portable hardware device 301.

Figure 4:
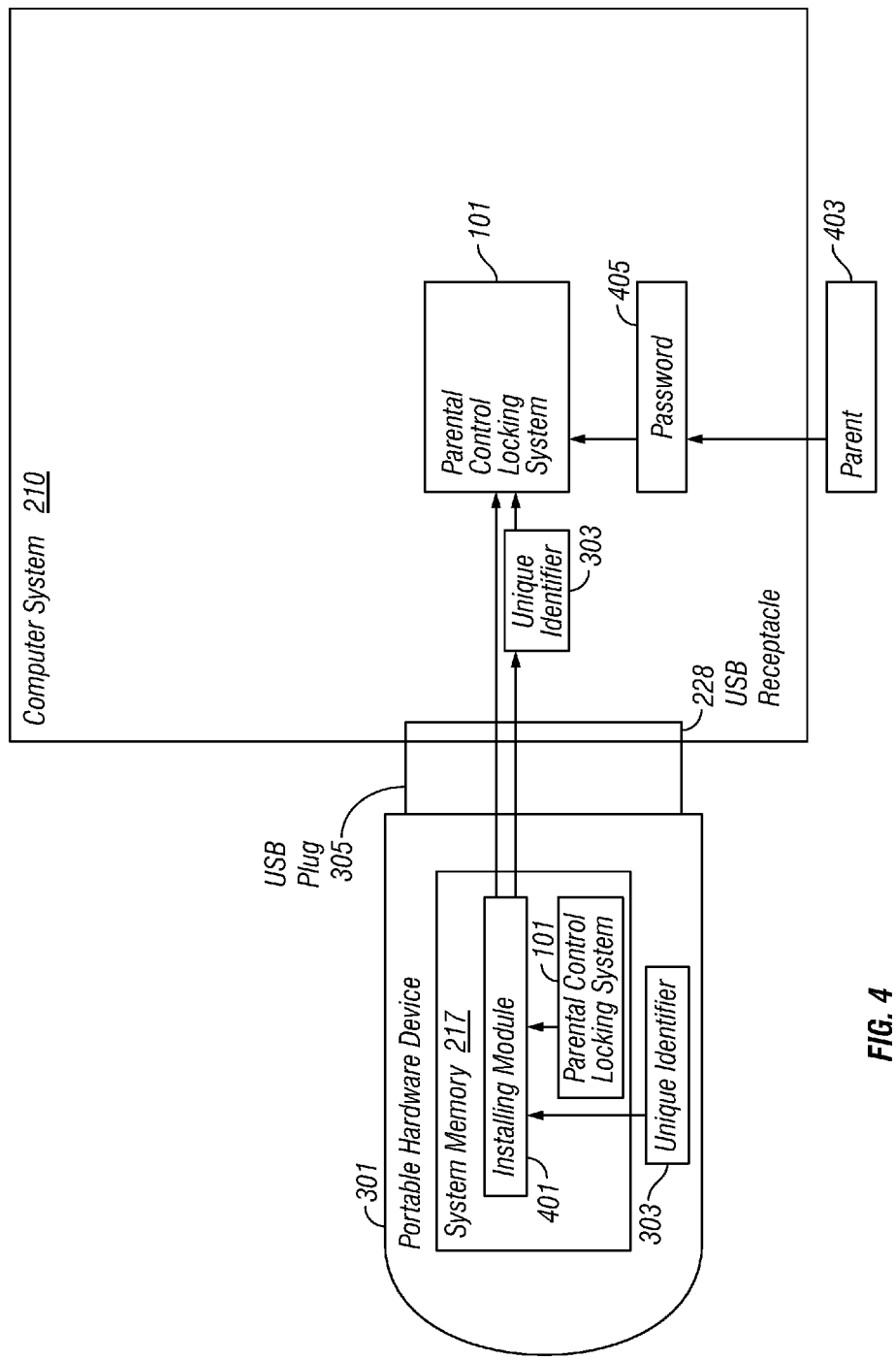
FIG. 4 is a block diagram of a portable hardware device coupled to a computer system for use with a parental control locking system, according to some embodiments.

Turning now to FIG. 4, in one embodiment in which the portable hardware device 301 comprises a USB memory stick or other device which contains computer memory 217, an installing module 401 resides in the memory 217 of the portable hardware device 301, and installs the parental control locking system 101 onto a computer system 210 which the parent 403 wishes to control. The installing module 401 can be configured to automatically launch the install of the parental control locking system 101 when the portable hardware device 301 is coupled to a computer system 210 on which the parental control locking system 101 is not already installed.

The installing module 401 can be instantiated in the form of a component configured to run automatically (e.g., an autorun component). Such components can be instantiated for a variety of different operating environments, such as Microsoft Windows®, Mac OS® and/or other supported platforms. The implementation mechanics of autorun components in general is within the skill set of those of ordinary skill in the relevant art, and the use thereof within the context of the described embodiments would be readily apparent to one of such a skill level in light of this disclosure.

In addition to installing the parental control locking system 101 on the computer system 210, the installing component can start the execution of the parental control locking system 101, read the unique identifier 303 from the portable hardware device 301 and write it to the computer system 210, and prompt the parent 403 to enter a password 405, which it can store on the computer system 210 for subsequent use if the portable hardware device 301 is lost, as described below.

In some embodiments in which a portable hardware device 301 without computer memory 217 is used, the installing module 401 resides on another type of computer readable medium (not illustrated) such as a CD-ROM, DVD, floppy disk, or Internet download site (not illustrated). In such embodiments, the installing module 311 executes when the storage medium is coupled to the computer system 210 (e.g., the parent 403 inserts the CD-ROM) or the install process is started by the parent 403 (e.g., by clicking on an icon to start the Internet download). In these embodiments, the installing module 311 checks for the presence of the portable hardware device 301, and prompts the parent 403 to couple it to the computer system 210 if it is not present. In response to the portable hardware device 301 being coupled to the computer system 210, the installing module 311 installs the parental control locking system 101 (as well as performing any additional installation steps such as capture of the unique identifier 303 of the portable hardware device 301 and/or obtaining the password 405).

In embodiments in which the portable hardware device 301 has computer memory 217 containing the installation module 401, the installation process can be as simple as inserting the portable hardware device 301 into a USB receptacle 228. Even in embodiments in which the installing module 401 resides on separate media, the installation process can simply comprise inserting a CD-ROM into a drive and following a few simple prompts.

Figure 5:
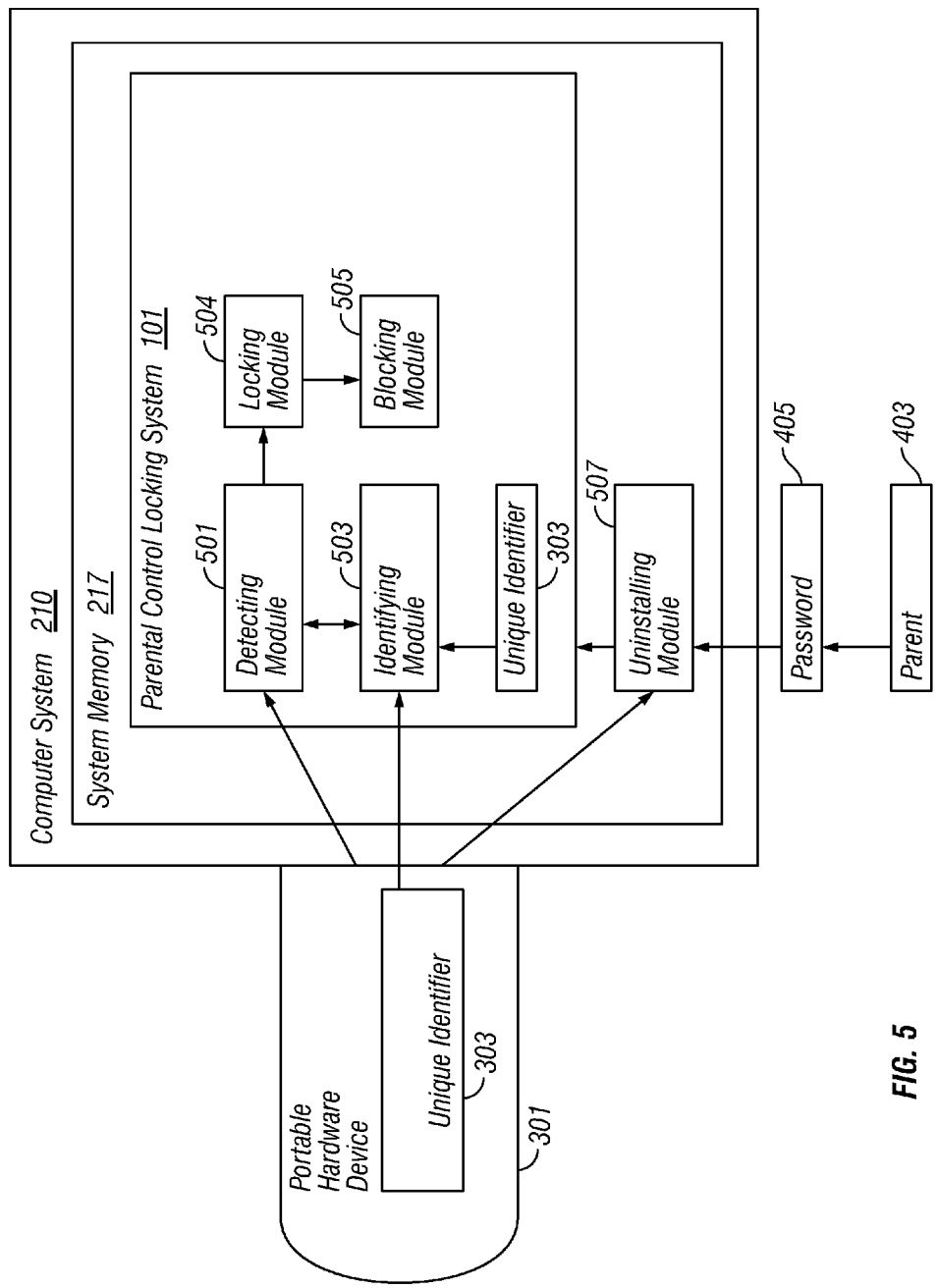
FIG. 5 is a block diagram of the operation of a parental control locking system, according to some embodiments.

FIG. 5 illustrates the operation of a parental control locking system 101, residing in the system memory 217 of a computer system 210 according to some embodiments. As described above, the functionalities of the parental control locking system 101 can reside on a client 103, a server 105, or be distributed between multiple computer systems 210, including within a cloud-based computing environment in which the functionality of the parental control locking system 101 is provided as a service over a network 107. It is to be understood that although the parental control locking system 101 is illustrated in FIG. 5 as a single entity, the illustrated parental control locking system 101 represents a collection of functionalities, which can be instantiated as a single or multiple modules as desired (an instantiation of specific, multiple modules of the parental control locking system 101 is illustrated in FIG. 5). It is to be understood that the modules of the parental control locking system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the parental control locking system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 5, once the parental control locking system 101 is installed on the computer system 210, the parental control locking system 101 determines whether or not the portable hardware device 301 is coupled to the computer system 210 in order to enforce parental control functionality. More specifically, a detecting module 501 of the parental control locking system 101 detects the coupling (e.g., insertion) and decoupling (e.g., removal) of the portable hardware device 301. The detecting module 501 can employ conventional device detection functionality to make such determinations. For example, under Microsoft Windows®, the detecting module 501 can be instantiated in the form of a service, driver or normal application that subscribes to DeviceChange events and scans for the presence of the portable hardware device 301. Similar functionality can also be implemented under other operating environments, for example by calling operating system services that flag the coupling and decoupling of hardware devices to the computer system 210.

When the detecting module 501 detects that a portable hardware device 301 is coupled to the computer system 210, an identifying module 503 uniquely identifies the detected portable hardware device 301 by reading its unique identifier 303. As noted above, many options exist for what data to use as a unique identifier 303. The portable hardware device can be uniquely identified by its USB device descriptor, which includes items like the vendor ID, product ID and a serial number. One, all or a combination of these can be used as the unique identifier 303 for the portable hardware device 301. As noted above, in embodiments in which the portable hardware device 301 supports data storage, the portable hardware device 301 could be 'branded' by writing a file to its computer memory 217 that contains unique data. This file could be written to the portable hardware device 301 before it is shipped, or for example by the installation module 401. For additional security, a combination of the device descriptor and the branding data could be used as the unique identifier 303.

Whatever the format, the identifying module reads the unique identifier 303 from the installed portable hardware device 301, and checks it against the unique identifier 303 stored on the computer system 210 by the installation module 401. It is to be understood that the version of the unique identifier 303 stored on the computer system need not be the same data read from the portable hardware device 301 itself, but simply sufficient data to perform a check for determining that the portable hardware device 301 currently coupled to the computer system 210 is the one associated with the installed parental control locking system 101. In some embodiments an actual copy of the unique identifier 303 of the portable hardware device 301 is stored on the computer system 210, whereas in other embodiments a hash thereof or other mechanism for reliably identifying the unique identifier 303 is stored.

Whenever the portable hardware device 301 associated with the parental control locking system 101 is not coupled to the computer system 210 (as determined by the detecting module 501 and the identifying module 503), the computer system 210 is considered to be "locked." In this case, a locking module 504 locks the computer system 210 by calling a blocking module 505 which blocks capabilities on the computer system 210, such as Internet access, all network access and/or the execution of specific applications (i.e. games, other entertainment software, etc.). What specific capabilities to block when the computer system 210 is locked is a variable design parameter, which can range from, e.g., just Internet access to specific local activities to all use of the computer system 210. Whenever the portable hardware device 301 associated with the parental control locking system 101 is coupled to the computer system 210, the computer system 210 is considered to be "unlocked," and the locking module 504 allows full use of the computer system 210. It is to be understood that in this way a single portable hardware device 301 can be used to control multiple computer systems 210, although only one of these computer systems 210 could be unlocked at a time.

The implementation of blocking functionality generally is within the skill set of those of ordinary skill in the relevant art, and the use thereof within the context of the described embodiments would be readily apparent to those of such a skill level in light of this disclosure. For example, under Microsoft Windows®, the blocking module 505 can be instantiated as a service, driver or normal application that hooks into the network stack to block network access, and optionally hooks into other key points in the system to block other actions. Similar functionality can be implemented under other operating environments by using appropriate system services to the same end.

An uninstalling module 507 can uninstall the parental control locking system 101 from the computer system 210, by deleting all of the installed files, undoing any changes made to the system settings by the parental control locking system 101, etc. The uninstalling module 507 removes the parental control locking system 101 responsive to, e.g., a control signal generated by a parent 403 operating a user interface or the like. The uninstalling module 507 uses the above described functionality to check for the presence of the portable hardware device 301 associated with the parental control locking system 101, and only performs the uninstall operation if the portable hardware device 301 is present. Should the parent misplace or lose the portable hardware device 301, the uninstalling module 507 can uninstall the parental control locking system 101 responsive to a parent entering the password 405 entered at install time. In some embodiments, the parent can also obtain a new portable hardware device 301 and direct the installed parental control locking system 101 to recognize it by entering the password 405.

In summary, in one embodiment a portable hardware device 301 in the form of a USB memory stick is sold preloaded with the parental control locking system 101 and the installation module 401 for automatically installing the parental control locking system 101 on a computer system 210. In other embodiments, the installation module 401 installs the parental control locking system 101 from another source such as a web site or CD-ROM. In these embodiments, the parental control locking system 101 can associate itself with any portable hardware device 301 which can be uniquely identified, such as a USB memory stick that the parent 403 already owns.

Thus, the parental control locking system 101 is able to make use of inexpensive commodity hardware to give parents 403 a plug-n-play, pull-n-lock solution to controlling their children's interaction with the Internet, games, or even the entire computer system 210. As previously described, parents 403 are unlikely to make use of any parental control solution that requires configuration (one time or ongoing). The parental control locking system 101 provides a solution to this problem by providing parents 403 with a "key" in the form of the portable hardware device 301, which allows operation of the computer system 210 when it is present, but which blocks computing activities when it is removed from the computer 210.

The parental control locking system 101 is analogous to a parent 403 controlling their children's access to a car by controlling the physical car keys. The parents 403 control access to the car by either giving the keys to the kid and letting him drive, or taking away the car keys and thus the driving privileges. Without the car keys, the child cannot drive the car. Similarly, the parental control locking system 101 provides parents 403 a "key" which, when given, unlocks a computer system 210, and which, when taken away, prevents the operation of the computer system 210. Standard, off-the-shelf commodity hardware such as USB memory sticks can be used as this key. Such devices are very inexpensive, and are supported by very close to 100% of all computers 210 used by consumers.

It is to be understood that the terms parents 403 and children as used herein are not limited to that specific literal relationship, but can encompass any two parties in which one party is responsible for controlling the use of a computer system 210 by the other (e.g., teachers and students, counselors and charges, employers and employees, etc.).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for using a portable hardware device to provide parental locking functionality to a computer system, the method comprising the steps of:
   detecting that the portable hardware device is communicatively coupled to the computer system by being plugged-in, based on an event of an operating system indicating that the portable hardware device is plugged-in to the computer system;
   responsive only to detecting that the portable hardware device is communicatively coupled to the computer system based on the operating system event, uniquely identifying the portable hardware device by reading a unique identifier, wherein the unique identifier comprises a device descriptor;
   responsive to a positive identification, unblocking at least some capabilities of the computer system if a unique identifier of the portable hardware device is associated with the parental locking functionality;
   responsive only to detecting that the portable hardware device is no longer communicatively coupled to the computer system, variably blocking the at least some capabilities of the computer system, wherein variably blocking the at least some capabilities of the computer system further comprises performing at least one step from a group of steps consisting of:
   blocking all network access by the computer system; and
   blocking playing of games by the computer system; and
   automatically uninstalling a parental control locking system from the computer system, responsive to 1) receiving an uninstall directive and 2) determining that the portable hardware device associated with providing parental locking functionality to the computer system is communicatively coupled to the computer system.

2. The method of claim 1 wherein detecting that the portable hardware device is communicatively coupled to the computer system comprises:
   detecting a coupling of a portable hardware device to the computer system.

3. The method of claim 1, further comprising:
   comparing the unique identifier read from the portable hardware device to a unique identifier stored on the computer system, the stored unique identifier identifying a specific portable hardware device as being associated with providing parental locking functionality to the computer system.

4. The method of claim 1 further comprising:
   determining that the portable hardware device associated with providing parental locking functionality to the computer system has been decoupled from the computer system; and
   blocking at least some capabilities of the computer system.

5. The method of claim 1 further comprising:
   automatically installing the parental control locking system to the computer system from a computer readable storage medium external to the computer system, responsive to 1) the computer readable storage medium being communicatively coupled to the computer system and 2) a parental control locking system not already being installed on the computer system.

6. The method of claim 5 wherein automatically installing a parental control locking system to the computer system further comprises:
   writing, to the portable hardware device communicatively coupled to the computer system, data uniquely identifying the portable hardware device.

7. The method of claim 6 wherein automatically installing a parental control locking system to the computer system further comprises:
   writing, to the portable hardware device communicatively coupled to the computer system, data uniquely identifying the portable hardware device.

8. The method of claim 5 wherein automatically installing a parental control locking system to the computer system further comprises:
   prompting a user to enter a password to associate with the parental control locking system;
   receiving an entered password responsive to the prompting step;
   associating the received password with the parental control locking system; and
   writing, to the computer system, the received password associated with the parental control locking system.

9. The method of claim 1 further comprising:
   automatically uninstalling a parental control locking system from the computer system, responsive to 1) receiving an uninstall directive and 2) receiving entry of a password associated with the parental control locking system.

10. The method of claim 1 further comprising:
automatically associating a new portable hardware device communicatively coupled to the computer system with providing parental locking functionality to the computer system, responsive to 1) receiving a directive and 2) receiving entry of a password associated with the parental control locking system.

11. A system for using a portable hardware device to provide parental locking functionality to a computer system, the system comprising:
a specific portable hardware device with a unique identifier comprising a device descriptor, the specific portable hardware device being associated with providing parental locking functionality to the computer system that blocks at least some capabilities of the computer system if a the unique identifier of the portable hardware device is associated with the parental locking functionality, the specific portable hardware device being configured to be communicatively coupled to the computer system and communicatively decoupled from the computer system;
a determiner of the computer system that detects events of an operating system indicating that the portable hardware device is communicatively coupled to the computer system by being plugged-in and that the portable hardware device is not communicatively coupled to the computer system by not being plugged-in;
an identifier of the computer system, that identifies a portable hardware device communicatively coupled to the computer system by reading a unique identifier from the portable hardware device, and to determine whether the unique identifier read from the portable hardware device identifies the portable hardware device as being associated with providing parental locking functionality to the computer system;
a locker of the computer system that variably blocks the at least some capabilities of the computer system, wherein variably blocking the at least some capabilities of the computer system further comprises performing at least one of: blocking all network access by the computer system; and blocking playing of games by the computer system, responsive only to the specific portable hardware device associated with providing parental locking functionality to the computer system not being communicatively coupled to the computer system and responsive to a positive identification to unblock the at least some capabilities of the computer system responsive only to the specific portable hardware device associated with providing parental locking functionality to the computer system being communicatively coupled to the computer system; and
an uninstaller of the computer system that automatically uninstalls a parental control locking system from the computer system, responsive to 1) receiving an uninstall directive and 2) determining that the portable hardware device associated with providing parental locking functionality to the computer system is communicatively coupled to the computer system.

12. The system of claim 11 wherein the specific portable hardware device associated with providing parental locking functionality to the computer system further comprises:
a Universal Serial Bus (USB) memory stick.

13. The system of claim 11 further comprising:
a blocker of the computer system that blocks at least some operations of the computer system responsive to the computer system being blocked.

14. At least one non-transitory computer readable storage medium storing a computer program product for using a portable hardware device to provide parental locking functionality to a computer system, the computer program product comprising:
program code for detecting that the portable hardware device is communicatively coupled to the computer system by being plugged-in, based on an event of an operating system indicating that the portable hardware device is plugged-in to the computer system;
program code for responsive only to detecting that the portable hardware device is communicatively coupled to the computer system based on the operating system event, uniquely identifying the portable hardware device by reading a unique identifier, wherein the unique identifier comprises a device descriptor;
program code for responsive to a positive identification, unblocking at least some capabilities of the computer system if a unique identifier of the portable hardware device is associated with the parental locking functionality;
program code for, responsive only to detecting that the portable hardware device is no longer communicatively coupled to the computer system, variably blocking the at least some capabilities of the computer system, wherein variably blocking the at least some capabilities of the computer system further comprises performing at least one of:
blocking all network access by the computer system; and
blocking playing of games by the computer system; and
program code for automatically uninstalling a parental control locking system from the computer system, responsive to 1) receiving an uninstall directive and 2) determining that the portable hardware device associated with providing parental locking functionality to the computer system is communicatively coupled to the computer system.

* * * * *